(12) United States Patent
Macfie (10) Patent No.: US 11,420,360 B2
(45) Date of Patent: Aug. 23, 2022

(54) LATCHING MECHANISM FOR SUPPOSITORY MOLD

(71) Applicant: Paula Noël Macfie, Portland, OR (US)

(72) Inventor: Paula Noël Macfie, Portland, OR (US)

(73) Assignee: Paula Noël Macfie, Portland, OR (US)

( * ) Notice: Subject to any disclaimer, the term of this patent is extended or adjusted under 35 U.S.C. 154(b) by 97 days.

(21) Appl. No.: 17/018,376

(22) Filed: Sep. 11, 2020

(65) Prior Publication Data

US 2022/0080625 A1    Mar. 17, 2022

(51) Int. Cl.

| | | |
|---|---|---|
| *B29C 33/20* | (2006.01) | |
| *B29C 39/02* | (2006.01) | |
| *A61J 3/08* | (2006.01) | |
| *E05C 19/14* | (2006.01) | |
| B29C 33/60 | (2006.01) | |
| B29C 33/58 | (2006.01) | |
| B29L 31/00 | (2006.01) | |
| B29C 39/38 | (2006.01) | |
| A23G 9/08 | (2006.01) | |
| A23G 9/22 | (2006.01) | |

(52) U.S. Cl.
CPC ............... *B29C 33/202* (2013.01); *A61J 3/08* (2013.01); *B29C 33/20* (2013.01); *B29C 39/02* (2013.01); *E05C 19/14* (2013.01); *A23G 9/083* (2013.01); *A23G 9/221* (2013.01); *B29C 33/58* (2013.01); *B29C 33/60* (2013.01); *B29C 39/38* (2013.01); *B29C 2033/207* (2013.01); *B29K 2905/02* (2013.01); *B29L 2031/753* (2013.01)

(58) Field of Classification Search
CPC ............ B29C 2033/207; B29C 33/202; B29C 45/641; E05C 19/14; E05C 19/007; A23G 9/083; A23G 9/221
See application file for complete search history.

(56) References Cited

U.S. PATENT DOCUMENTS

| | | | | |
|---|---|---|---|---|
| 746,971 | A * | 12/1903 | Marchiony | ............ A23G 9/221 99/372 |
| 757,848 | A * | 4/1904 | Steidl | ...................... E05C 19/14 292/113 |
| 759,181 | A * | 5/1904 | Kerr | ........................ E05C 19/14 292/249 |
| 927,614 | A * | 7/1909 | Tobey | ..................... E05C 19/14 16/349 |
| 960,961 | A * | 6/1910 | Kusterer | ................. E05C 19/14 292/247 |
| 2,083,081 | A * | 6/1937 | Moll | ...................... A23G 9/083 249/134 |
| 4,244,470 | A * | 1/1981 | Burnham | ............... A23G 9/221 426/414 |
| 10,377,063 | B1* | 8/2019 | Koren | ..................... B29C 41/38 |
| 2006/0266915 | A1* | 11/2006 | Parker | .................... A23G 9/221 249/66.1 |

(Continued)

*Primary Examiner* — Benjamin A Schiffman (57) ABSTRACT

A latching mechanism suitable for suppository molds, where the latching mechanism is designed to assist the separation of mold when the latch is released. In embodiments, the latching mechanism has a lever portion on a first mold half and a catch portion on a second mold half. The lever portion is configured to impinge upon the catch portion to provide a force to bias the first mold half away from the second mold half. Other embodiments include methods of utilizing such a catching mechanism with a suppository mold.

11 Claims, 8 Drawing Sheets

(56) References Cited

U.S. PATENT DOCUMENTS

2008/0073481 A1\* 3/2008 Fornier ................ E04G 13/021
 249/48
2020/0368972 A1\* 11/2020 Shimizu ................ A61L 27/50

\* cited by examiner

LATCHING MECHANISM FOR SUPPOSITORY MOLD

TECHNICAL FIELD

Embodiments herein relate to the field of suppository mold used for making suppositories.

BACKGROUND

Suppositories can be used for relieving pain, such as joint pains caused by arthritis or pain and suffering in cancer patients. Suppositories are made using suppository molds. The base of the suppository is in the form of liquid in room temperature. To make the suppository usable, the liquid is frozen using suppository molds. Suppository molds are often made of two or more pieces that are secured using bolts and screws.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In what follows, reference is made to the accompanying drawings of embodiments that may be practiced. It should be understood that other embodiments may be utilized and structural or logical changes may be made without departing from the scope of the invention. Therefore, the following description is not intended to be taken as limitation and the scope of embodiments is defined by the claims and their equivalents.

Suppositories are commonly made in the form of a cone or cylinder for introduction into an open body cavity. There are many kinds of molds used to form suppositories, such as shell molds, which are capable of retaining a liquified medicated suppository preparation and which can be broken to permit the Withdrawal of the suppository after solidification. These shell molds are often joined into large banks to increase the number of suppositories that may be formed during a single pouring operation. In such cases, however, the molds serve the single function of holding the liquified medicated preparation and retaining it until sufficient time elapses to permit cooling and solidification of the medicated preparation. To expedite solidification the mold might be placed in a freezer. When the suppository has become a solid waxy body, the molds are either broken or separated, permitting the suppository to be Withdrawn for subsequent wrapping and packaging. However, a frozen mold is not easy to hold or separate, especially for a person with joint pain or with motor neuron disorders.

Disclosed embodiments include a suppository mold that can be easily separated allowing the user to easily access the suppositories when ready. In one embodiment, the mold consists of two pieces, where the two pieces are held next to each other using at least one draw latch, creating one or more mold voids to allow for a multitude of different casting volumes, size, and/or shape variances. The design of the mold is such that when the draw latch releases it forces the two halves of the mold to separate from one another.

The benefit is that the mold opens much easier with the latch innovation. The device can be used by people with disabilities who have limited use of their fingers or hands. The mold latch assists the mold opening and releasing, especially after taking out of freezer. Some suppository formulas require freezing as an option. The available molds in the market stick together when frozen, and are difficult to use without fine motor skills.

In one embodiment the mold is made from aluminum but could be made from stainless steel, titanium, fiber reinforced nylon, ultra-high molecular weight polyethylene (UMHWPE), Teflon, or any other compatible material.

In another embodiment, the mold may have a conformal coating to aid in the ease of release of the cooled product such as hard anodizing in the case of aluminum, passivation if made from stainless steel, or ultrahydrophobic or lyophobic coatings.

Figure 1:
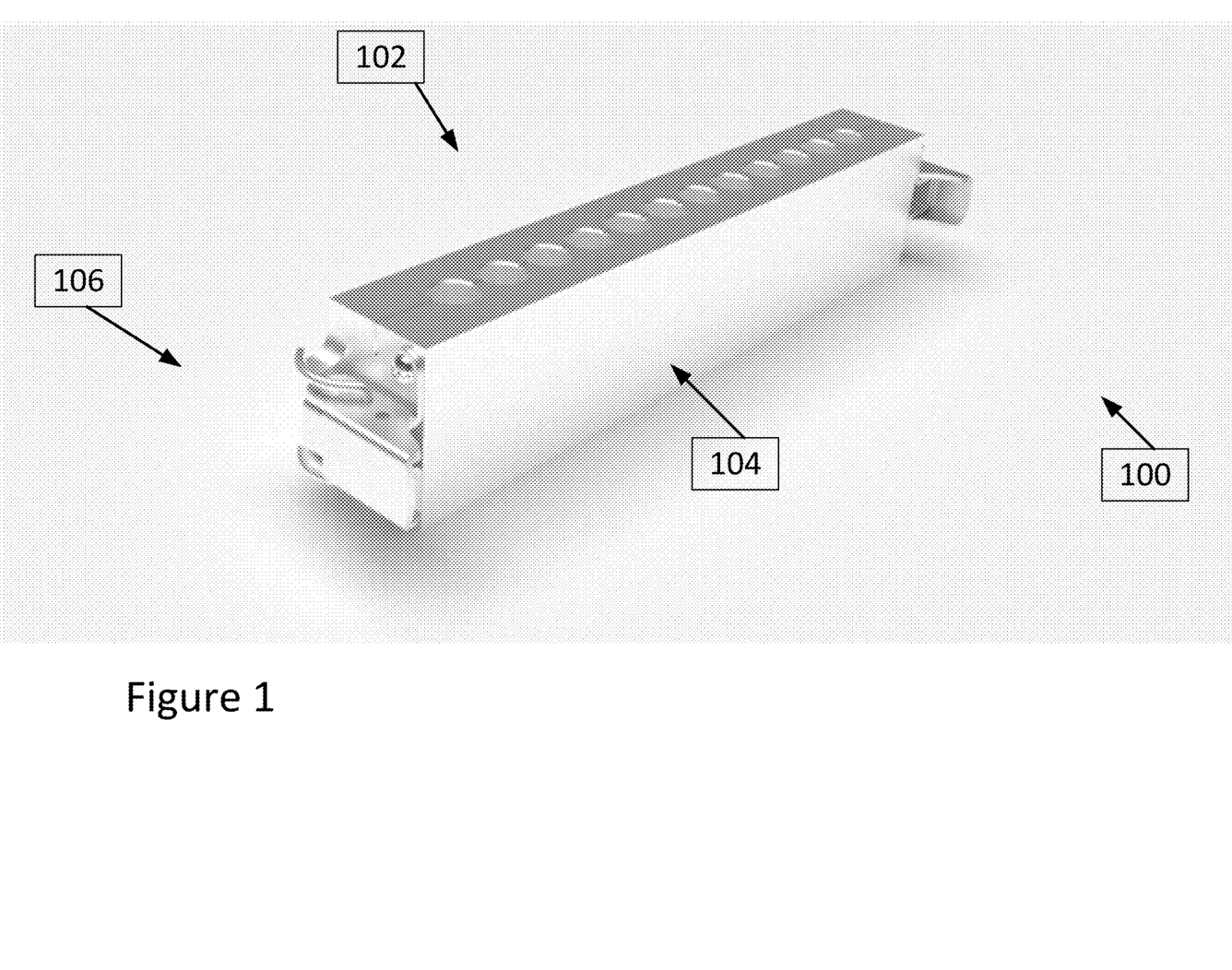
FIG. 1 shows the components of a suppository mold.
Figure 5:
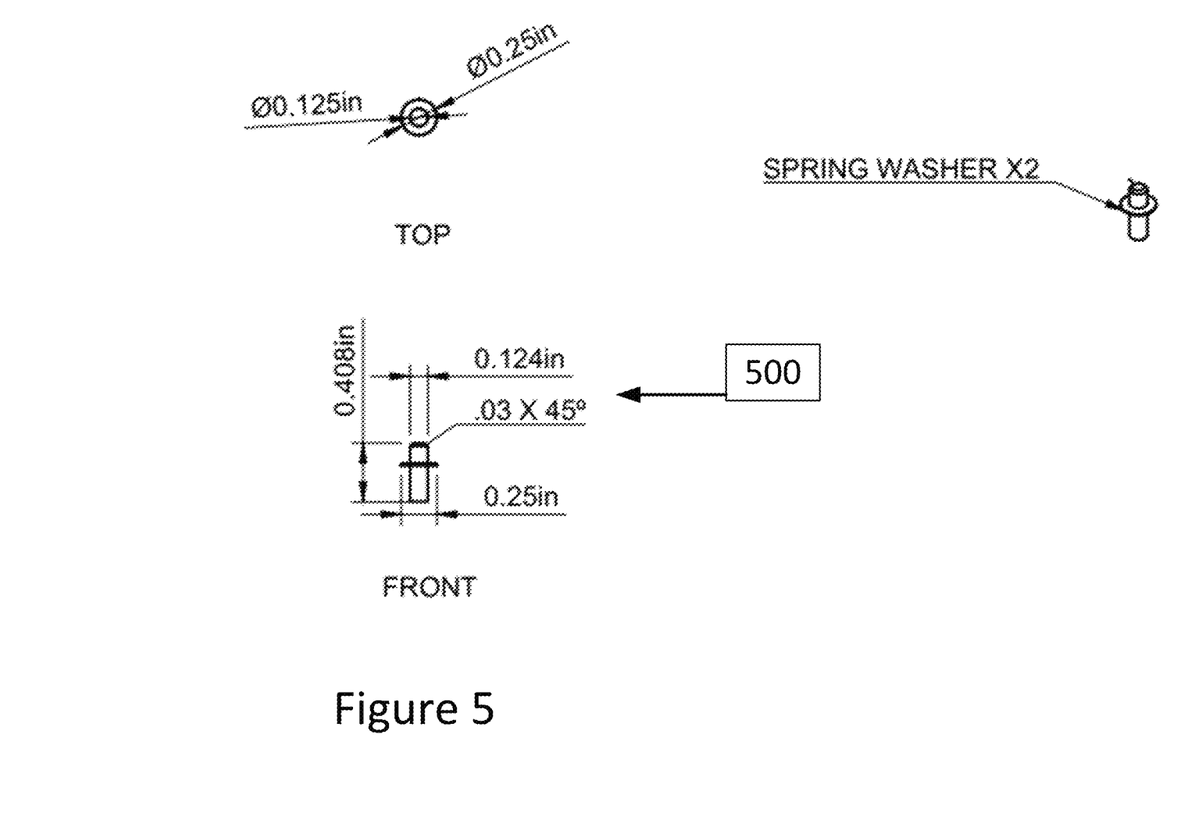
FIG. 5 shows the guiding pins.

FIG. 1; depicts a mold 100, the mold 100 including a first mold half 102 (depicted in FIG. 2), a second mold half 104 (depicted in FIG. 3), and at least one latch 106 (depicted in FIG. 5). The latch that is secured on one half engages with an ear on the other half and presses the two halves against each other in order to keep the material to be molded in the mold cavities and prevent them from seeping out.

Figure 2:
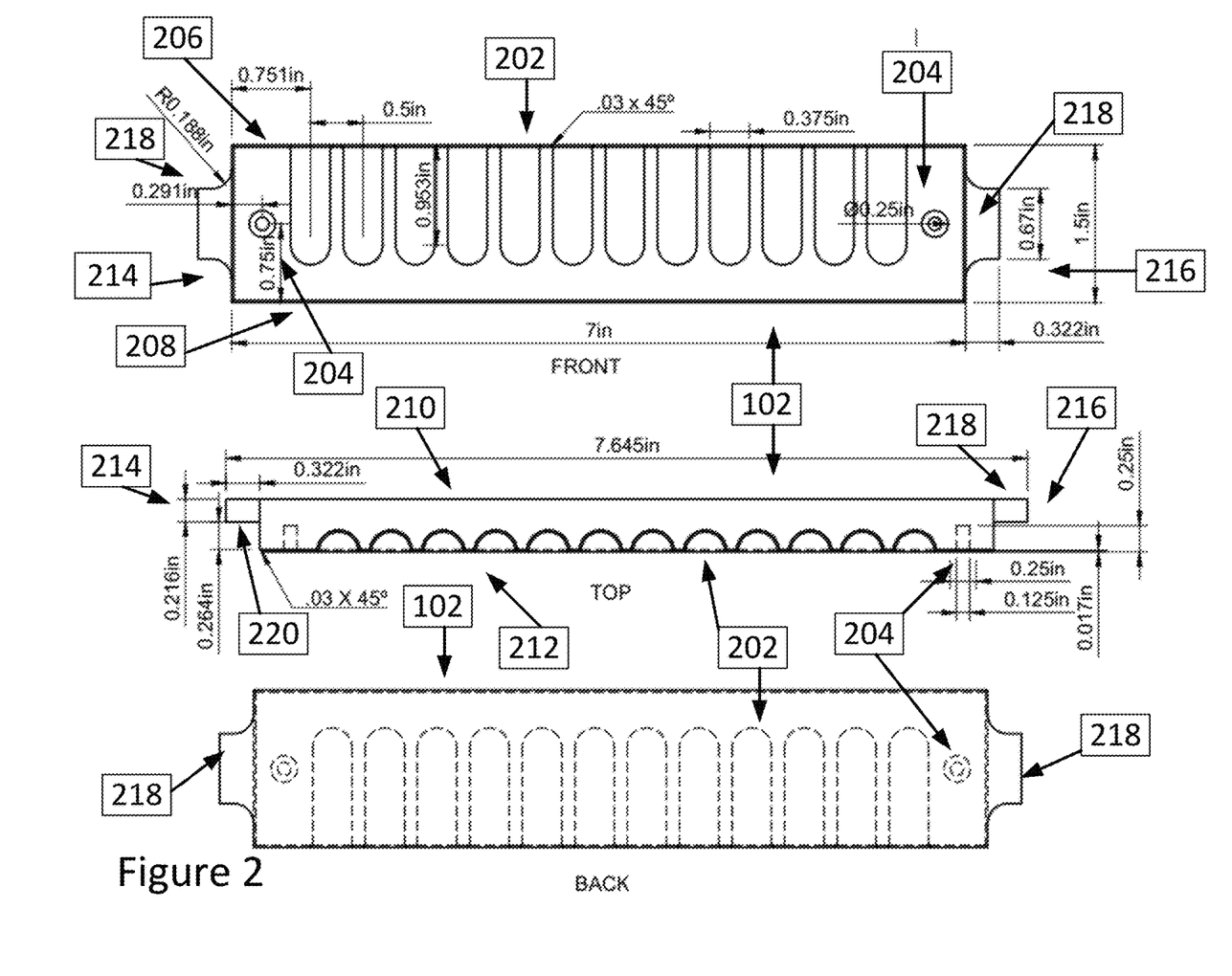
FIG. 2 shows the Front, Top, and Back view of the first half of the mold.

FIG. 2; depicts the first mold half 102 which may have a general shape of a rectangular cube. FIG. 2 consists of three figures depicting the first mold half 102 from three different views; front view, top view, and back view. The first mold half 102 may comprise of one or two ears or catches 218. Each of the ears or catches 218, is sized and shaped to selectively interact with a corresponding latch that secures to the ear 218, as will be discussed in greater detail below.

In one embodiment each ear 218 may be made as one piece with the body of the first mold half 102. In other embodiment, the ears 218 might be made separately and attached to the first mold half 102 using an attachment mechanism such as adhesives, soldering, welding, pins, or screws. The ears 218 may be made of the same material as the mold halves 102 and 104, or different material. The ears 218 may have grooves or other mechanisms to improve the engagement with the latch 106. The ears 218 are also designed and placed such that they are close to latch tip 710 to effectively facilitate the separation of mold halves.

The first mold half 102 may have plurality of holes 204, which may be used in combination with plurality of guiding pin 400 to facilitate and guide the alignment of the two halves of the mold.

Figure 3:
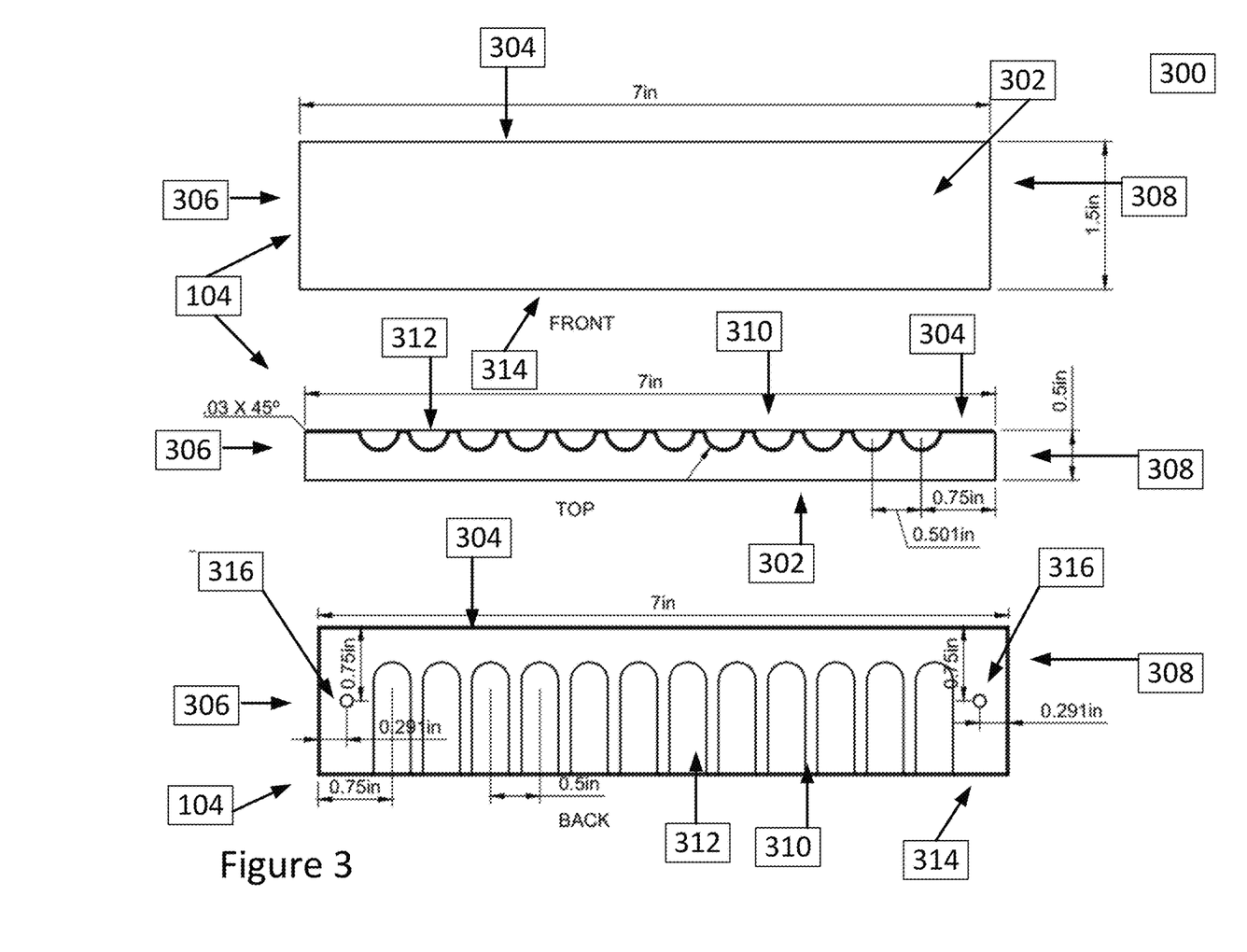
FIG. 3 shows the Front, Top, and Back view of the second half of the mold.

FIG. 3; depicts the second mold half 104 which may have a general shape of a rectangular cube. FIG. 3 consists of three figures depicting the second mold half 104 from three different views; front view, top view, and back view. The second mold half 104 may have a plurality of holes 316 which may be used in combination with plurality of guiding pin 400 to facilitate and guide the alignment of the two halves of the mold.

Figure 4:
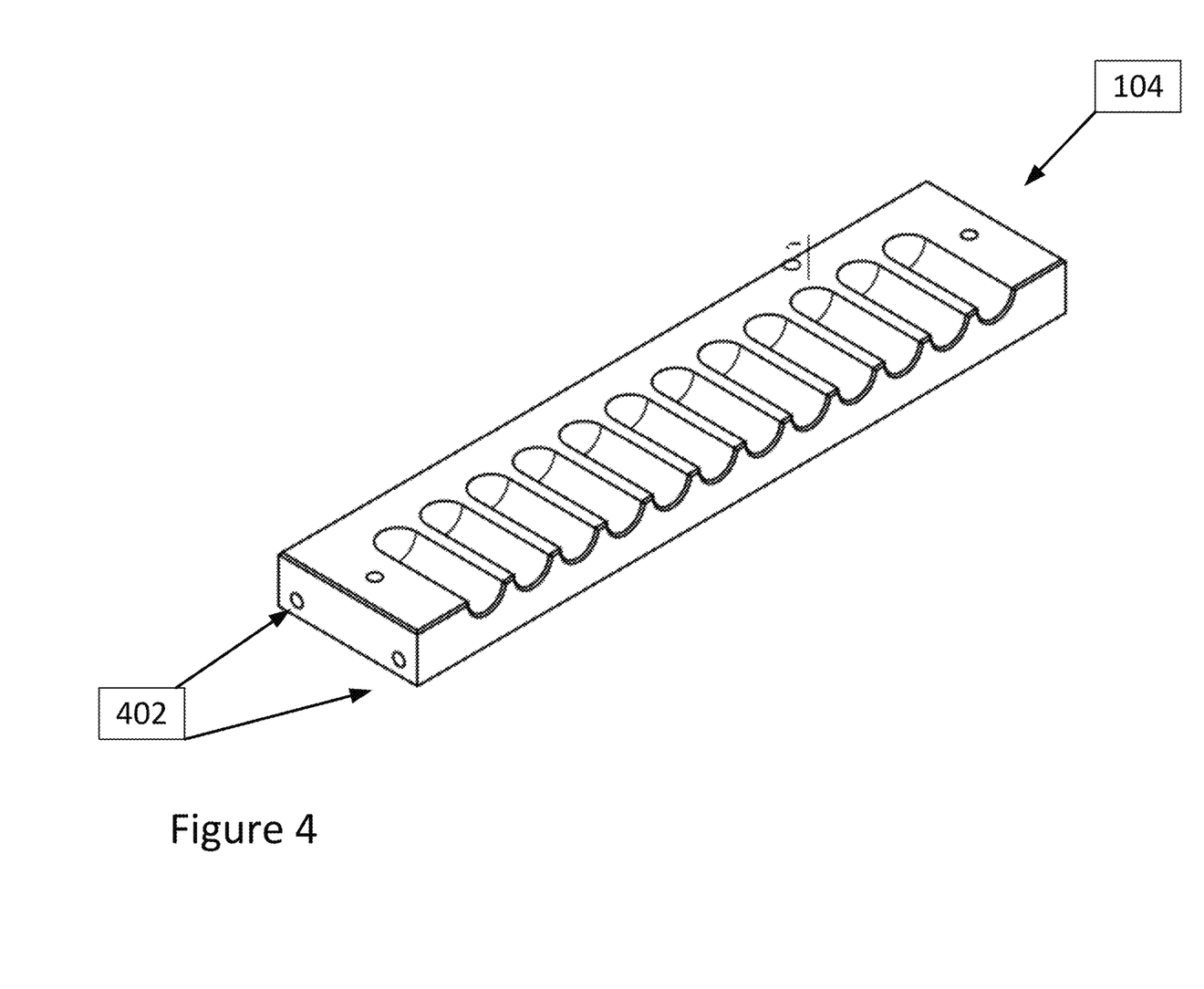
FIG. 4 shows the NE Isometric view of the second half of the mold.

FIG. 4; depicts the second mold half 104 from an isometric point of view. The second mold half 104 may have screw holes 402 that may be used for securing the latch 106 on the second mold half 102.

FIG. 5; depicts the guiding pin 500. Plurality of guiding pins 500 may be used in combination with the plurality of holes 204 in the first mold half 102 or the plurality of holes 316 in the second mold half 104.

Figure 6:
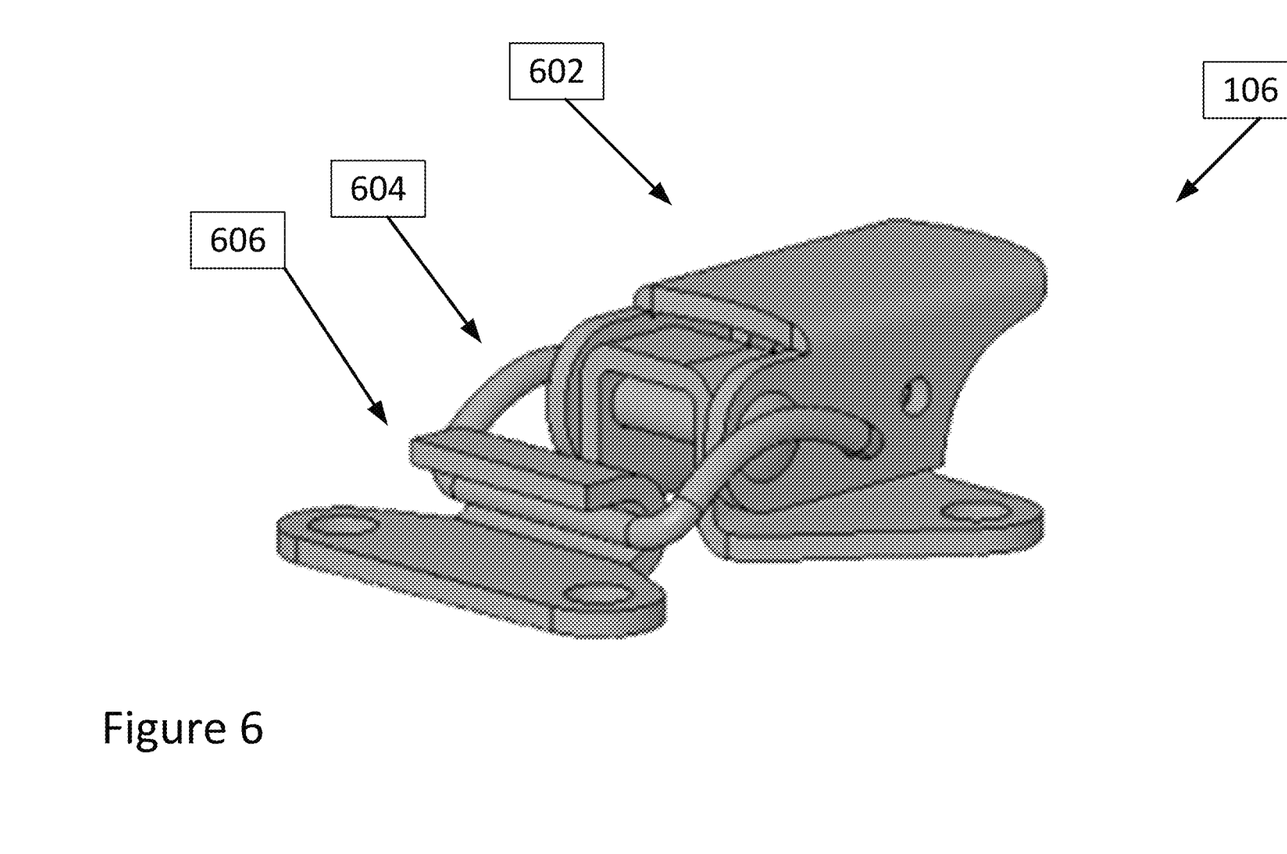
FIG. 6 shows the draw latch.

FIG. 6; depicts a draw latch 106 which may be used for securing and keeping the two halves of the mold together. The draw latch may have a lever 602 that may be used for closing or opening the mold.

The draw latch 106 may be mounted on one of the mold halves. In one embodiment the draw latch 106 may be mounted on the second mold half 104 and secured on the second mold half 104 using the screw holes 402. When the lever 602 is pushed downward to close, it pulls the loop 604 which is engaged with the catch or ear 218 and thus pulling the first mold half 102 towards the second mold half 104.

In one embodiment one end of the two mold halves might be joined together using a hinge that keeps one end of the two halves together. The other end of the two halves could be secured using a draw latch 106.

In another embodiment, there are draw latches at two or more ends of the mold that would keep the two halves pressed against each other. In another embodiment the draw latches 106 might be mounted on different mold halves, for example one draw latch 106 attached to the first mold half 102 and a second draw latch 106 attached to the second mold half 104.

Figure 7A:
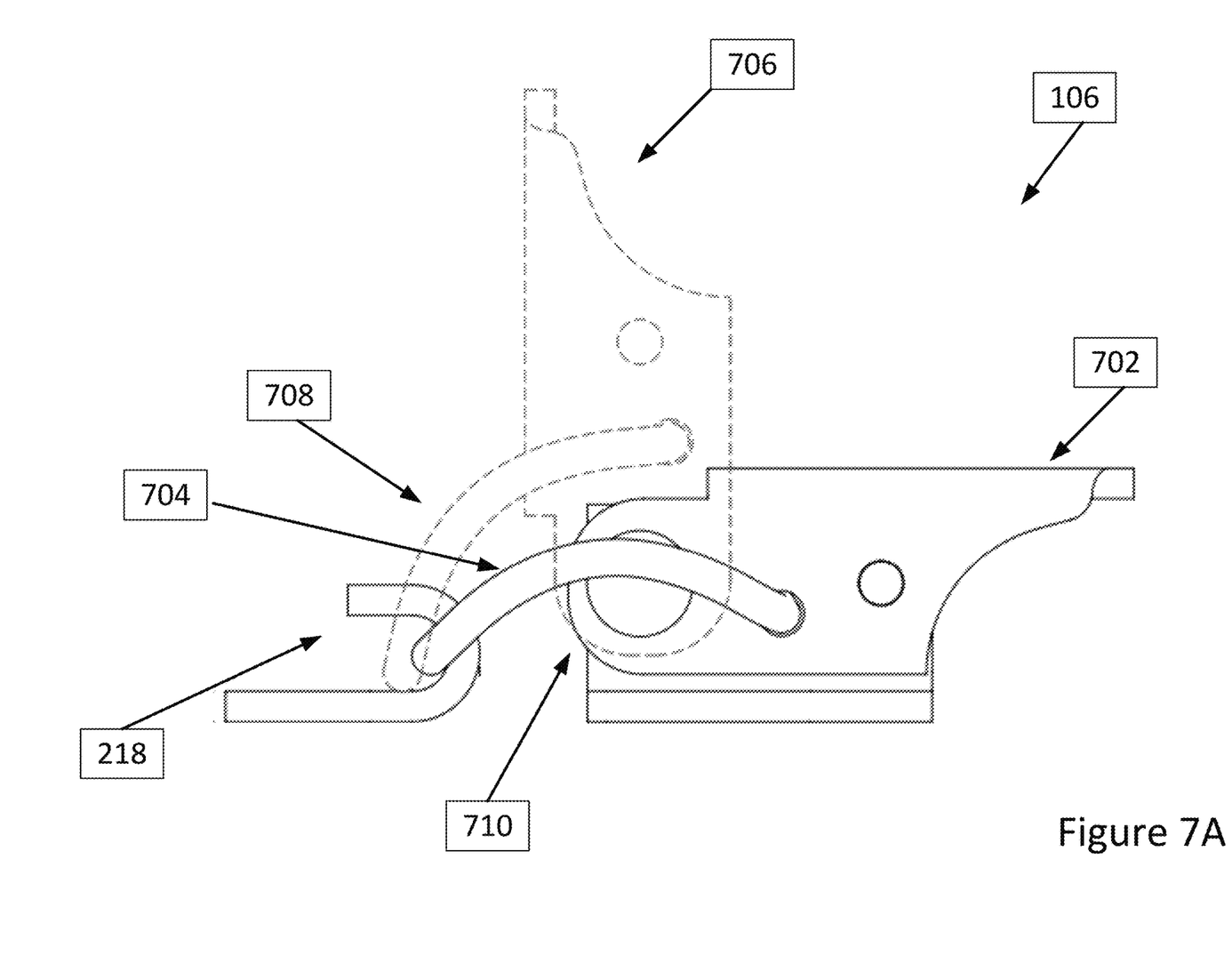
FIGS. 7A and 7B show the draw latch at closed and released positions.
Figure 7B:
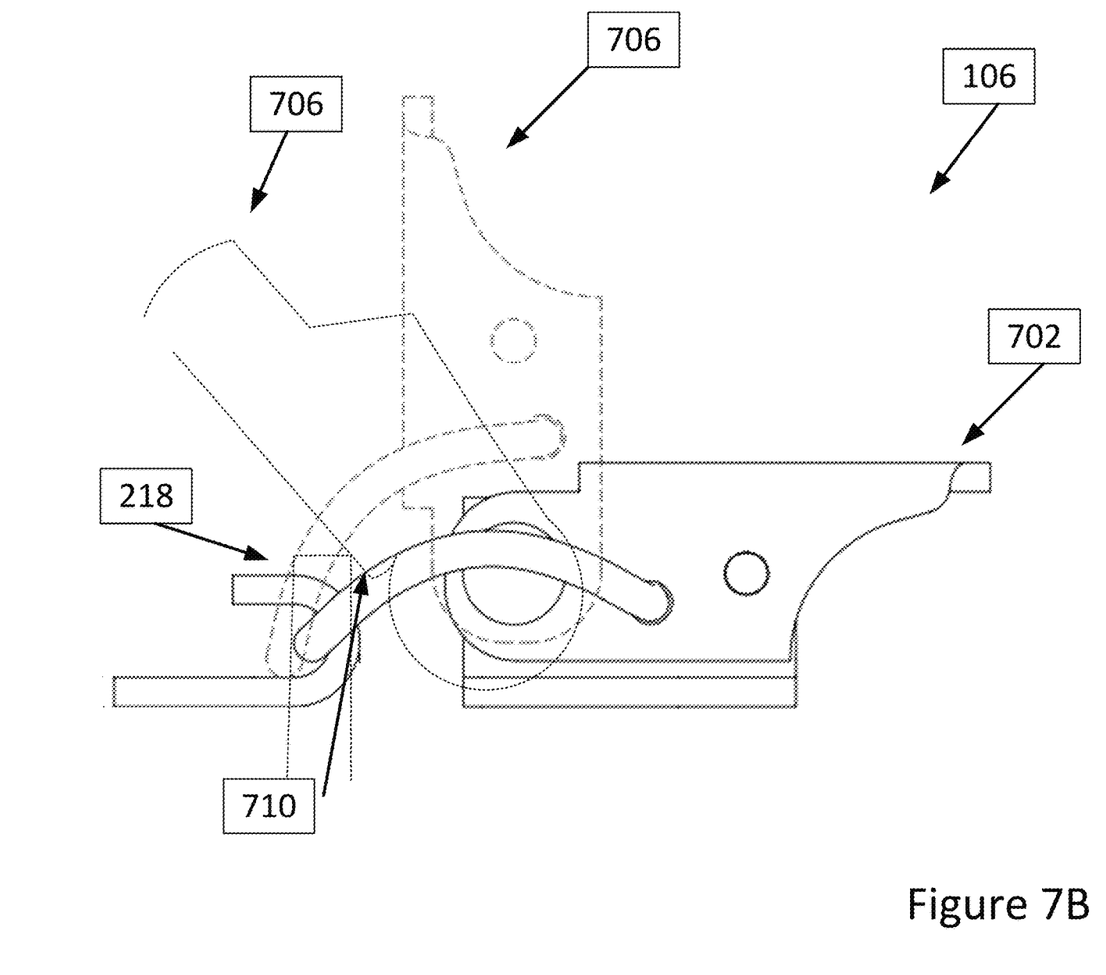

FIGS. 7A and 7B; depicts the latch in open and closed position and shows how the latch may facilitate separation of the mold halves. In one embodiment with ears 218 on the first mold half 102 and draw latch 106 attached to the second mold half 104, when releasing the latch by moving the lever 602 from closed position 702 to release position 706, the latch tip 710 impinges on the ear 218 and thus pushing the first mold half 102 away from the second mold half 104.

In one embodiment, the mold may be rectangular in shape, with a flat surface opposite the openings to place the mold on a stable surface for casting. With the release of the draw latches, the mold is allowed to separate along the median line of the bar for removal of the cast product. The two halves of the mold may be symmetrical except for bosses, tabs, or ears that extend from the side of one half of the mold to engage with the draw latch that is secured on the other half. Theses bosses or ears also serve to give the latch a surface to mechanically force the two mold halves apart when disengaging the draw latches.

In one embodiment of the disclosed invention, the mold may be made of two identical halves 102. Each half has six surfaces, the first surface 302, or the back side, that is flat, the second surface 310, or the front side, which contains plurality of voids or cavities 312, the third and forth surfaces 306 and 308, referred to as side surfaces, that are flat, the fifth surface 304, or the bottom of the mold, which is flat and designed for the mold to stand on a stable surface, and the six surface 314, or the top of the mold, and is used to pour the liquid solution into the mold for casting and making the product.

In the disclosed embodiment, to form a mold the second surfaces 212 and 310 of the two halves are placed facing each other and pushed together such that the plurality of cavity voids (or simply cavities) 202 on the first mold half 102 is aligned with the plurality of cavity voids 312 on the second mold half 104. To facilitate the mating of the two halves of the mold, plurality of holes 316 and 218 might be made in similar locations on two halves. The holes 316 on the second mold half 104 might be filled with plurality of pins 500. The pins guide the alignment for mating the two halves and could keep the two halves next to each other. When aligned properly the cavities or voids 312 and 202 on both halves are facing one another and forming the mold-cells or cavities.

In order to keep the two halves next to each other in tight and secure fashion, a securing mechanism might be used. In one embodiment, the two halves might be kept together by a clamp or a clip. In another embodiment the two halves might be secured using a screws and nuts. In the disclosed embodiment, a draw latch 106 might be used to keep the two halves tight and secure during casting.

To add the draw latch 106, modifications need to be done to the two halves of the mold. FIGS. 1-7B depict an example embodiment of disclosed invention that allows the use of draw latch 106. In what follows the example embodiment is described in detail.

The draw latch 106 consists of two parts, a lever 602 and a loop or hook 604. The draw latch is secured on the second mold half 104, at least one ear 218 is designed on the fourth surface 216 of the first mold half 102 that engages with the draw latch loop 604 when the draw latch lever 602 is in release position 706, and by pulling down the draw latch lever 602 to the closed position 702, the loop 604 pulls the ear 218 and consequently the first mold half 102 towards the second mold half 104.

The embodiment of the disclosed invention is designed such that when releasing the latch 106, that is, when moving the latch lever 602 from the closed or engaged position 702 to release position 706, the tip 710 of the lever impinges on the ear 218, pushing the first mold half 102 away from the second mold half 104 which in turn facilitate separation of the two halves from one another.

In one embodiment, only one ear 218 is designed by extending the fourth surface 216 of the first mold half 102. In one embodiment a groove may be designed to facilitate and to improve the engagement of the draw latch loop 604 with the ear 218. The draw latch 106 my be secured on the fourth surface 308 of the second mold half 104. In one embodiment the latch 106 may be secured using screws that engages with screw holes 402.

In another embodiment there might be one ear 218 on the third surface 214 and another ear 218 on the fourth surface 216 of the first mold half 102. There might be at least one draw latch 106 to secure the two halves of the mold. There might be one draw latch 106 secured on the third surface 306 of the second mold half 104. In another embodiment, there might be a second draw latch 106, secured on the fourth surface 308 of the second mold half 104.

In another embodiment one side of the mold might use ear 218 and draw latch 106 mechanism and the other side of the mold might use hinges to connect the two halves.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A suppository mold, comprising a first mold half with a surface comprised of a first plurality of cavities, and a second mold half with a surface comprised of a second plurality of cavities, such that when the first mold half is attached to the second mold half, the surface of the first mold half is disposed against the surface of the second mold half such that the first plurality of cavities and the second plurality of cavities form a plurality of suppository mold cavities, the mold further comprising:
   a draw latch that includes a lever portion, the draw latch disposed on an end of the first mold half; and
   a corresponding catch disposed on an end of the second mold half;
   wherein the lever portion is configured to engage the catch when the draw latch is pivoted away from the end of the first mold half so as to apply a force that biases the second mold half away from the first mold half.

2. The suppository mold of claim 1, wherein the ends of the first mold half and the second mold half are first ends, and the first mold half and the second mold half are joined together by a hinge attached to a second end on the first mold half and a second end on the second mold half.

3. The suppository mold of claim 1, wherein the ends of the first mold half and the second mold half are first ends, and the first mold half and the second mold half are further secured by a draw latch that is disposed on a second end of the first mold half and corresponding catch disposed on a second end of the second mold half.

4. The suppository mold of claim 1, wherein the first mold half and the second mold half are made from material selected from aluminum, stainless steel, titanium, fiber reinforced nylon, ultra-high molecular weight polyethylene (UMHWPE), or Teflon.

5. The suppository mold of claim 1 wherein the first mold half and the second mold half are covered by a conformal coating.

6. The suppository mold of claim 5, wherein the conformal coating is one of a hard anodizing, passivation, ultra-hydrophobic, or lyophobic coatings.

7. The suppository mold of claim 1, wherein each of the plurality of cavities opens to an edge on its respective mold half.

8. A method for forming a suppository, comprising:
   disposing a surface of a first mold half against a surface of a second mold half, each of the surfaces including a plurality of voids that form a plurality of mold cavities when the first mold half is disposed against the second mold half;
   securing the first mold half to the second mold half using a plurality of latches, each latch of the plurality of latches disposed upon one of the mold halves and engaging an ear on the other mold half;
   filling one or more of the plurality of mold cavities with a desired compound;
   freezing the desired compound;
   releasing the first mold half from the second mold half by disengaging each of the plurality of latches,
   wherein upon disengagement, each latch impinges upon its corresponding ear and pushes the two mold halves away from each other.

9. The method of claim 8, wherein each of the plurality of mold cavities opens to an edge on the mold, and filling the one or more of the plurality of mold cavities comprises inserting, through an opening in an edge of the first and second mold halves, the desired compound.

10. The method of claim 8, wherein each of the plurality of latches is disposed upon a different mold half.

11. The method of claim 8, wherein each of the plurality of latches is disposed upon the same mold half.

\* \* \* \* \*